United States Patent [19]

Berggren et al.

[11] 4,050,887

[45] Sept. 27, 1977

[54] METHOD AND APPARATUS FOR TEMPERATURE CONDITIONING PARTS

[75] Inventors: L. John Berggren, Simsbury; Charles L. D. Chin, Avon; Joseph R. Reilly, Naugatuck, all of Conn.

[73] Assignee: Monsanto Company, St. Louis, Mo.

[21] Appl. No.: 520,620

[22] Filed: Nov. 4, 1974

Related U.S. Application Data

[62] Division of Ser. No. 418,075, Nov. 21, 1973, Pat. No. 3,894,835.

[51] Int. Cl.$^2$ .................... F27B 9/14; F02M 17/28
[52] U.S. Cl. .................... 432/122; 264/94; 264/98; 425/526; 432/124
[58] Field of Search .............. 264/94, 97, 98, 99; 432/122, 124, 11; 425/387, 445, 446, DIG. 208, DIG. 213

[56] References Cited

U.S. PATENT DOCUMENTS

| | | | |
|---|---|---|---|
| 1,774,161 | 8/1930 | Wetmore | 432/122 |
| 3,149,373 | 9/1964 | Marzillier | 425/384 |
| 3,320,397 | 5/1967 | Alexander | 432/11 |
| 3,321,564 | 5/1967 | Dobbins | 425/DIG. 208 |
| 3,339,230 | 9/1967 | Farrell | 425/DIG. 208 |
| 3,415,915 | 12/1968 | Lecluyse | 264/94 |
| 3,449,792 | 6/1969 | Plummer | 264/94 |
| 3,715,109 | 2/1973 | Gilbert | 432/122 |
| 3,752,641 | 8/1973 | Moore | 432/122 |
| 3,754,851 | 8/1973 | Reilly | 425/387 |
| 3,822,980 | 7/1974 | Graeper | 432/124 |
| 3,995,990 | 12/1976 | Dwyer | 432/124 |

Primary Examiner—Ronald H. Lazarus
Assistant Examiner—Daniel J. O'Connor
Attorney, Agent, or Firm—Michael J. Murphy

[57] ABSTRACT

Apparatus for temperature-conditioning workpieces comprises a series of bar assemblies for supporting a number of elongated molded parts in side-by-side relationship, heat transfer assemblies including horizontally spaced panels extending along a chamber, means for conveying the parts supported in the bar assemblies through the chamber between the panels and rotating means operatively interconnected with the conveying means and bar assemblies for turning the parts. Infeed means sequentially release loaded bar assemblies at regular intervals to the chamber while metering means preferably driven through downstream equipment continuously release bar assemblies to the discharge end of the chamber. Reciprocable gate means allow temperature-conditioned parts to drop out of the bar assemblies to collection equipment. Process improvements include a.) varying parts conditioning time by varying the number of bar assemblies in the fixed length chamber; b.) maintaining a temperature gradient between circumferentially uneven thick and thin sections of a preform wall to be reshaped into a molecularly oriented article in order to even out wall thickness reductions occurring during stretching in the article forming step.

20 Claims, 11 Drawing Figures

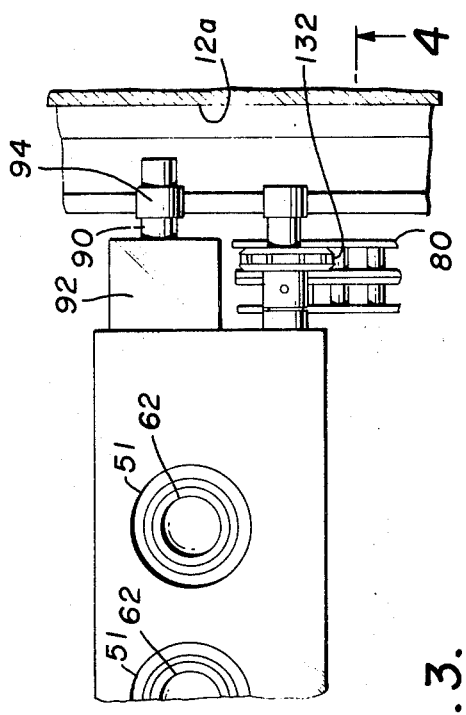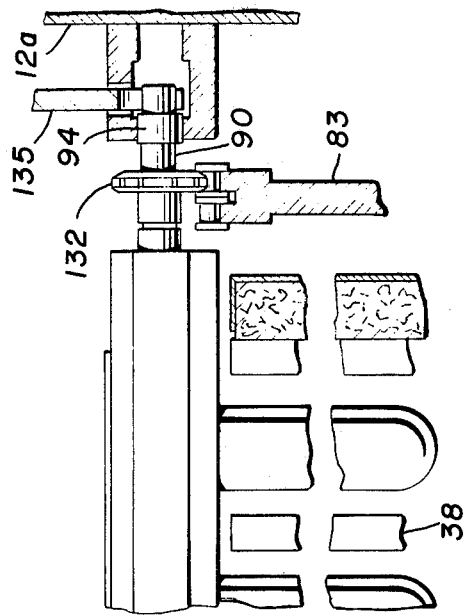
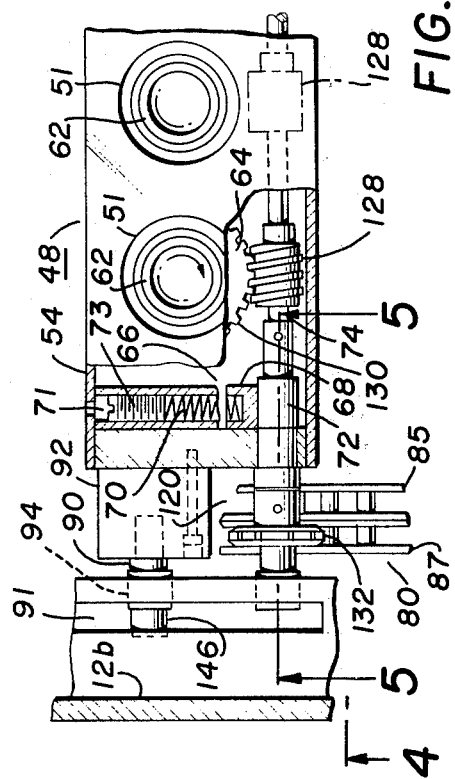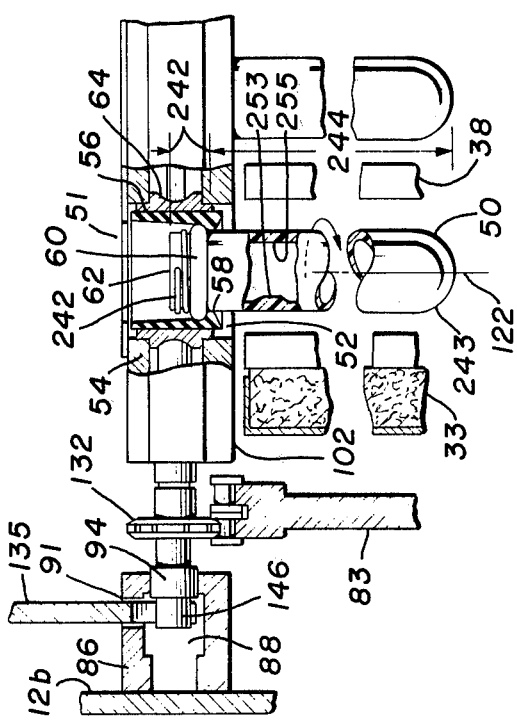
FIG. 3.
FIG. 4.

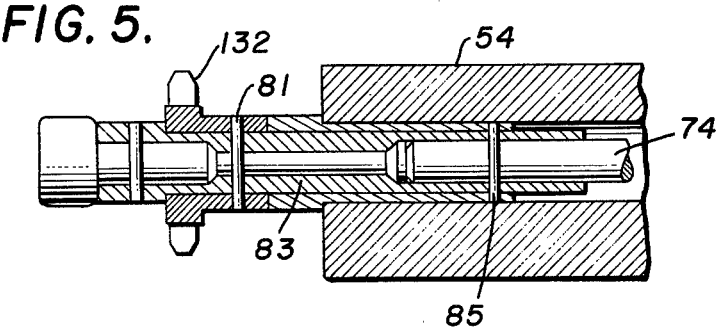
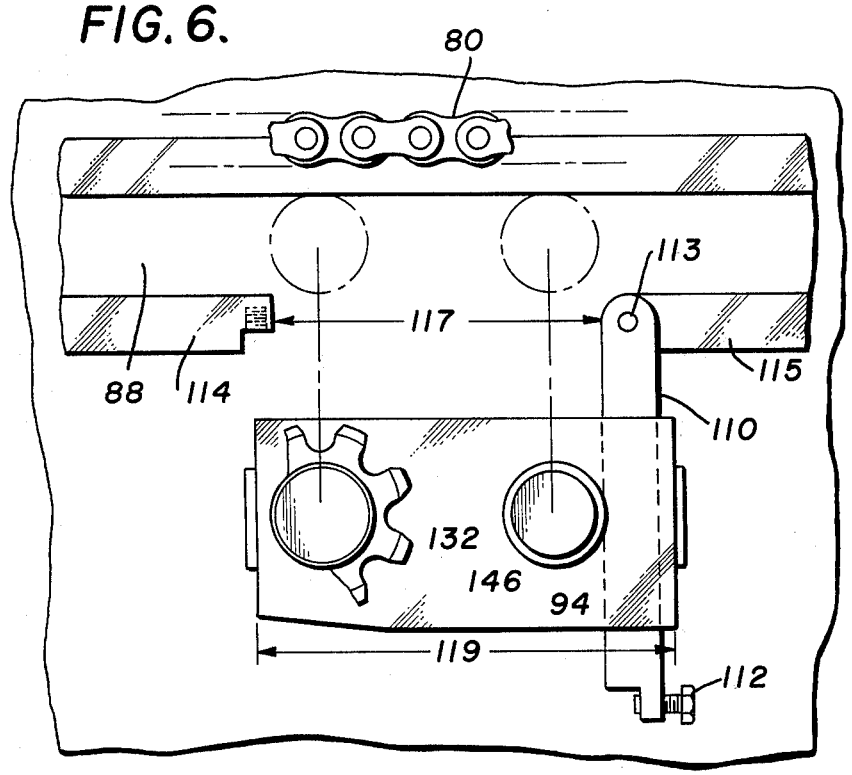

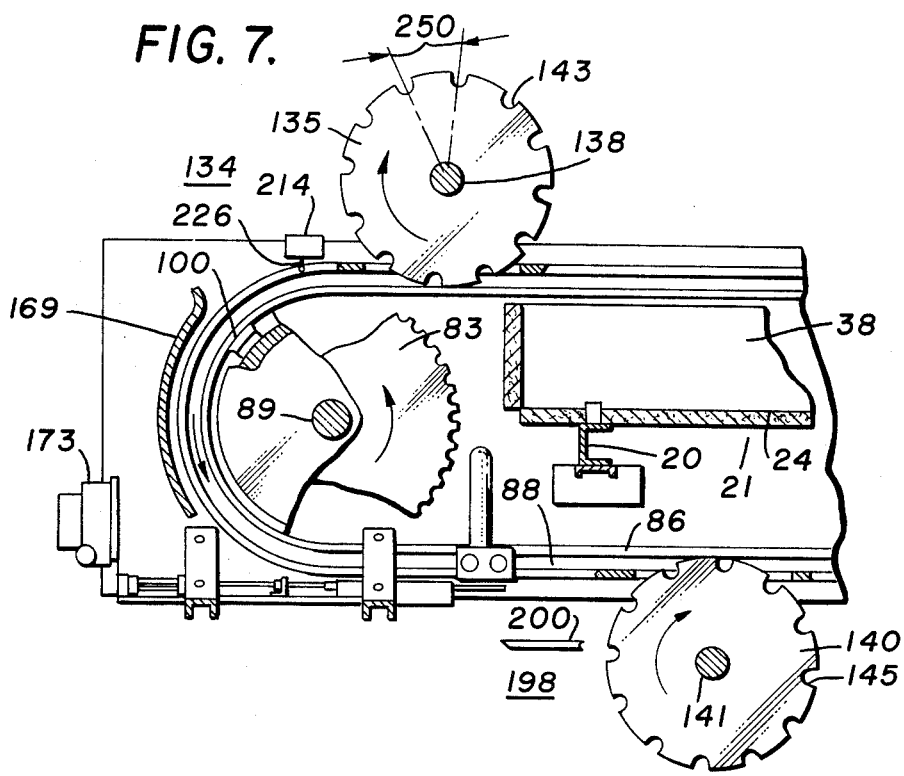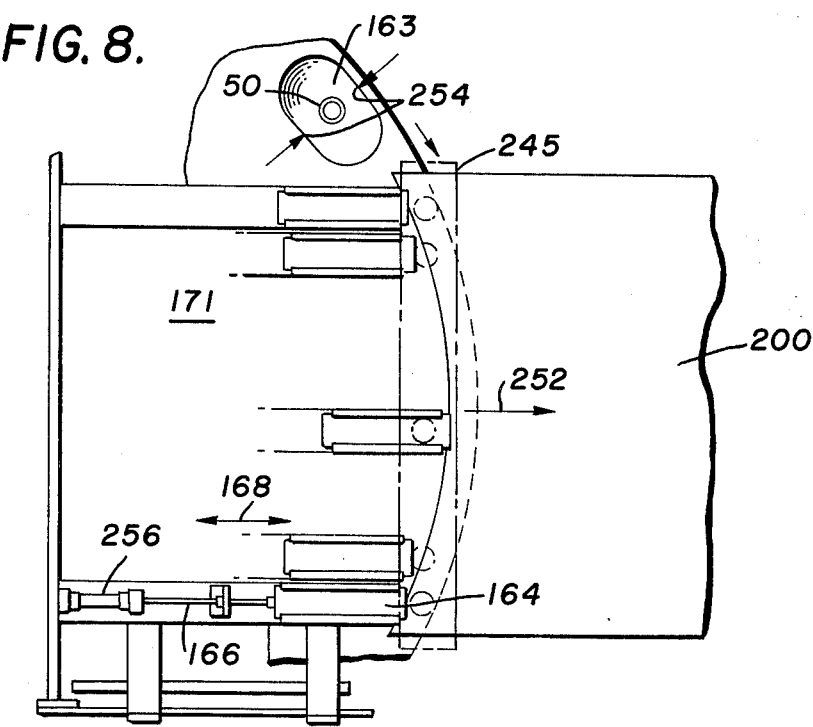

METHOD AND APPARATUS FOR TEMPERATURE CONDITIONING PARTS

This is a division, of application Ser. No. 418,075, filed Nov. 21, 1973, now U.S. Pat. No. 3,894,835.

BACKGROUND OF THE INVENTION

This invention is directed toward method and apparatus improvements for temperature-conditioning workpieces such as elongated thermoplastic parts which are to be subsequently further shaped into molecularly oriented hollow articles such as containers.

In U.S. Pat. No. 3,754,851, a system is disclosed for blowing articles from molded preforms which are brought to orientation temperature in an intermediate conditioning step. In this approach heat is removed from the preform during conditioning and such has become known in the art as a "cool-down" process. It is likewise known to add heat to preforms to bring them up to orientation temperature prior to finish forming as is typically disclosed in U.S. Pat. No. 3,715,109 and other related prior art, and such has become known in the art as a "reheat" process. In high speed, high capacity forming lines utilizing either of these approaches, it is clearly desirable to optimize the temperature-conditioning part of such techniques in order to keep fabricating costs related to this step at an absolute minimum. Thus, it is desirable to process a large number of parts at the same time, to minimize handling and reorienting movement of the distortable parts during conditioning, to provide flexibility of conditioning to accommodate different input temperatures and to expose each part as uniformly and completely as possible to the heat sink to minimize exposure time and complexity of apparatus.

Though the above-mentioned prior art has generally been successful in implementing cool-down and reheat processing, it is deficient in one or more aspects of the temperature-conditioning phase, especially when such conditioning is considered in the environment of a high speed, continuous, large capacity forming line.

Also, with respect to cool-down processes such as disclosed in U.S. Pat. No. 3,754,851, it has been noted that thickness variations in the wall of the thermoplastic preform traceable back to a non-homogeneous melt wherein portions during extrusion are more fluid than others, are carried over into the final molding step and appear as similar variations in the finished article. Such variations adversely affect performance especially when the article is a container such as a bottle intended for holding pressure. This differential thickness occurring in the circumferential direction is most pronounced when the preform is shaped by blowing from an extruded parison (though it occurs to a lesser extent in injection molding), and should be accommodated, especially if blown preforms are to represent a viable path to oriented containers for pressurized applications.

SUMMARY OF THE INVENTION

Now, there has been developed improvements in temperature conditioning especially adapted for use with parts intended to be subsequently blown into molecularly oriented articles, which avoid the aforementioned prior art shortcomings.

Accordingly, it is a basic object of this invention to provide improvements in temperature-conditioning workpieces.

Another object of this invention is to provide improvements to facilitate efficient handling of a large number of elongated molded parts during temperature conditioning.

A further object of this invention is to provide improvements in blow molding molecularly oriented containers such as bottles intended for pressurized applications.

An additional object of this invention is to provide improvements in temperature-conditioning preforms which are to be shaped in downstream molding equipment into molecularly oriented articles.

A specific object of this invention is to provide improvements in the temperature-conditioning stage of a cool-down process for forming molecularly oriented containers which result in improved uniformity of wall thickness in such containers.

A specific object of this invention is to provide for varying the residence time of parts in a temperature-conditioning zone independent of the rate of discharge of the parts from the zone and of the temperature of the heat transfer medium in such zone.

A further object of this invention is to provide means for carrying out the above-mentioned objects.

Another object of this invention is to provide simplified means for rotating elongated workpieces about their axes during conditioning.

Other objects of this invention will in part be obvious and will in part appear hereinafter.

These and other objects are accomplished in a process for conditioning molded parts by passing them through a chamber containing heat transfer assemblies while the parts are in fixed position with respect to each other in the direction of movement through the chamber and then continuously discharging the parts from said chamber at a constant rate after conditioning, by providing the improvement which comprises changing molded part residence time in the chamber by varying the length of the path of exposure to the heat transfer assemblies while keeping the temperature of the assemblies, the position of the parts with respect to each other and the discharge rate, substantially constant.

Specific process aspects comprise loading a plurality of elongated molded parts in side-by-side relationship into consecutively presented parts-supporting bar assemblies at a charging station, passing the parts while so supported in one direction along a series of generally parallel paths between adjacent heat transfer assemblies, rotating the parts about their vertical axes during movement along such paths while transferring heat between the parts and heat transfer assemblies, discharging the parts by gravity from the bar assemblies after traversing such paths and then recycling the empty bar assemblies to the charging station to receive additional parts.

Also, when a molecularly oriented container of thermoplastic material is being formed by molding a preform from such material which has a body with varying circumferential wall thickness portions at different relative temperatures in excess of those at which substantial molecular orientation can be developed, passing the preform through a conditioning zone to bring the material temperature in such portions to within the range at which substantial orientation can be developed and then stretching and blowing the temperature-conditioned preform to form the container, there is provided the improvement which comprises avoiding development of a uniform temperature in the body during passage through such conditioning zone in order to maintain a temperature differential between thick and thin sections of the body during stretching and blowing.

The apparatus comprises horizontally spaced, longitudinally extending heat transfer assemblies in a chamber defining the aforementioned paths, a plurality of bar assemblies for simultaneously supporting a plurality of such parts in vertical position, means for advancing the bar assemblies through the chamber along the paths and rotating means operatively interconnected with the advancing means and the bar assemblies for turning the parts about their axes. A bar assembly comprises a housing having a series of horizontally spaced openings in which are situated part-supporting and rotating mechanisms. The rotating means preferably includes a shaft extending through each bar assembly having spaced worm sections in meshing engagement with the parts-supporting and rotating mechanisms and sprockets at opposite ends rotatably engaging the advancing means.

Metering means are provided for sequentially releasing bar assemblies to the discharge end of the chamber, as are infeed means for cyclically releasing bar assemblies at regular intervals to the chamber. When the preforms are being reshaped into molecularly oriented containers in downstream molding equipment, the latter preferably drives the metering wheels directly in synchronism with movable hopper means beneath the discharge end of the chamber for accepting the parts as they are released from the bar assemblies.

BRIEF DESCRIPTION OF THE DRAWINGS

In describing the overall invention, reference will be made to the accompanying drawings wherein:

FIG. 3 is a partial, sectional, plan view of the parts-holding and rotating components positioned at the discharge end of the apparatus, taken along 3—3 of FIG. 2;

FIG. 4 is a partially sectioned, elevational view taken along 4—4 of FIG. 3;

FIG. 5 is a partial, sectional view taken along 5—5 of FIG. 3;

FIG. 6 is an enlarged, vertical sectional view of a track portion of the apparatus of FIG. 1;

FIG. 7 is an enlarged, partially sectioned, schematic view of components at the discharge end of the apparatus of FIG. 1, taken at 90° to that of FIG. 2;

FIG. 8 is a plan view of components shown in FIG. 7;

DETAILED DESCRIPTION OF PREFERRED EMBODIMENTS

Figure 1:
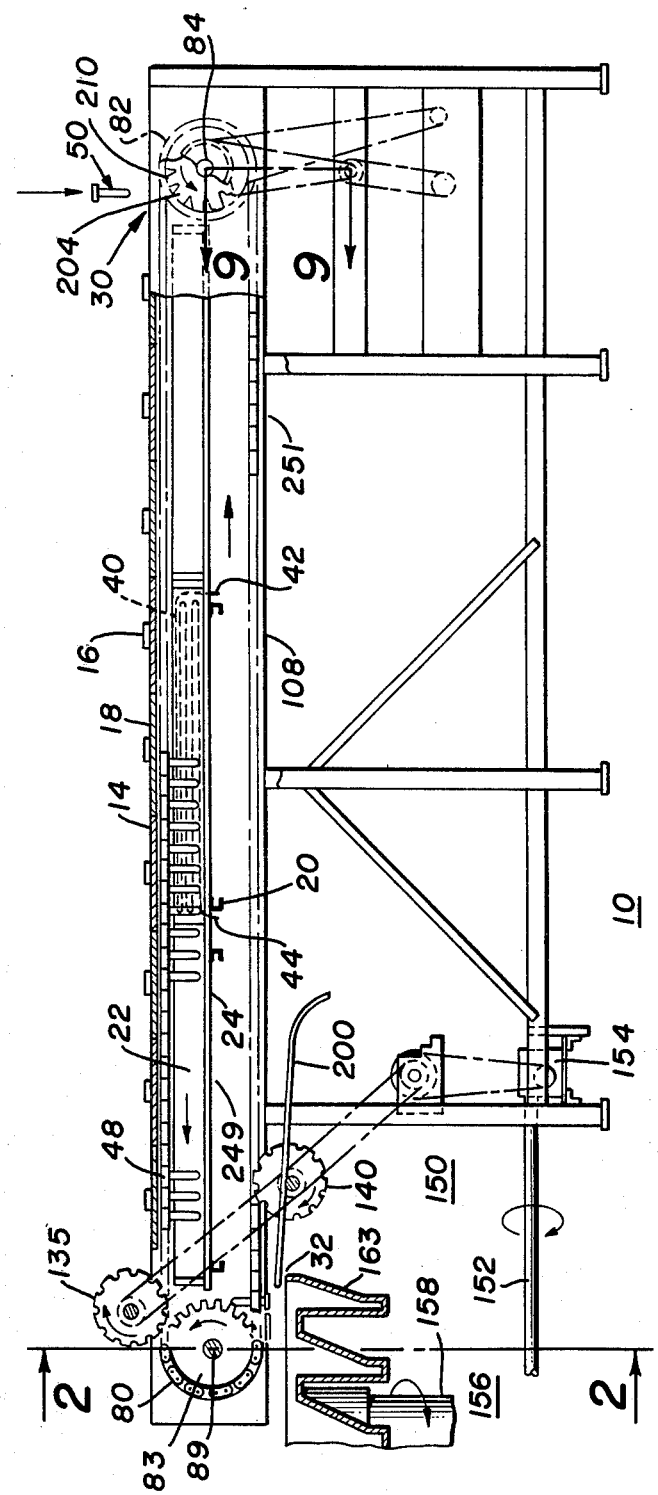
FIG. 1 is a vertical, partially schematic, sectional view of temperature-conditioning apparatus embodying the invention.

Referring now to the drawings, there is illustrated in FIG. 1, apparatus 10 for temperature-conditioning elongated molded parts. Apparatus 10 comprises wall sections formed of a suitable material such as sheet metal which include opposing vertical side panels 12a and 12b (FIG. 2) and top panel 14 (FIG. 1) which may be divided into pieces provided with handles 16 forming removable covers such as 18. Horizontal support members 20 span the space between panels 12a and 12b and support heat transfer units, such as 21 (FIG. 7), secured thereto and positioned in end to end relationship so as to form a horizontally extending heat transfer zone or chamber generally indicated as 22. Three such units are typically illustrated in FIG. 1. Each unit 21 has a base portion which collectively form floor member 24 dividing chamber 22 into an upper course 26 (FIG. 2) and a lower course 28, such lower course 28 being downwardly open to the surroundings along its length. Insulation such as 33 in FIG. 4, may be provided as necessary to prevent loss of heat to the surroundings. Chamber 22 has a feed end generally indicated at 30 in FIG. 1 at which is located a charging or loading station, and an opposite discharge end similarly indicated at 32.

Each heat transfer unit 21 comprises a heat transfer assembly which includes upright panels 38 spaced from each other in the horizontal direction and extending along the length of chamber 22. Each panel 38 (FIG. 2) is secured to its portion of floor member 24 and contains flow channels generally indicated as 40 in FIG. 1 in serpentine form having means including tube portions 42 and 44 connected via suitable conventional valving into a reservoir for circulating a heat transfer medium under pressure through channels 40, for the purpose of controlling the air temperature between adjacent panels. A narrow, generally parallel path 39 (FIG. 2) is therefore formed by adjacent panels 38 for the parts being temperature conditioned and which is preferably only slightly greater in width than that of the portion of the parts being conditioned. In the illustrated embodiment, ten such paths or channels 39 are shown.

A plurality of bar assemblies 48 (FIG. 3) support workpieces such as elongated molded parts 50 (FIG. 1) in suspended vertical position between adjacent panels 38. Each bar assembly 48 when in a parts-conditioning position within chamber 22 is situated immediately above panels 38 (FIG. 1) and arranged for movement from feed end 30 to discharge end 32 and back again in an endless path in a manner to be described. Bar assembly 48 includes annular, part-supporting and rotating mechanisms 51 (FIGS. 3 and 4), situated in a series of horizontally spaced, linearly arranged openings 52 formed in a vertically thin, horizontally long, rectangular housing 54, each such mechanism being vertically aligned above a path 39 when in part-supporting position in apparatus 10. Though assemblies 48 in the illustrated embodiment are above panels 38 when in the heat transfer zone of the apparatus because of the particular configuration of parts 50 being treated, it is possible to position them beneath heating units with parts being treated seated therein in an upright position. Each mechanism 51 comprises part support insert or socket 56 having a collar 58 at its lower end for cooperating with step portion 60 adjacent the open end 62 of elongated molded part 50 in the manner particularly shown in FIG. 4. Insert 56 is secured by suitable means such as a pin in a vertical slot, not shown, to annular pinion 64 seated in opening 52 by means of frictional engagement with the wall thereof. Each assembly 48 may include a brake mechanism 66 operatively associated with shaft 74 which in the illustrated embodiment comprises shoe member 68 in forced surface contact by means of compression spring 70 with a collar 72 fixed on shaft 74, the latter to be further decribed hereafter. The force urging member 68 against collar 72 may be set by means of adjusting screw 73 threadably engaged with the surface or bore 71 containing spring 70. Though any material may be used, housing 54, pinion 64 and part-support insert 56 are preferably formed of a strong, low heat conductive material such as fiber-reinforced phenolic plastic.

Means (FIGS. 1 and 3) for advancing each bar assembly 48 through chamber 22 comprises an endless chain 80 (FIG. 1) on each side of chamber 22 extending lengthwise thereof and a pair of sprockets 82 and 83 (FIGS. 1 and 4) for each such chain at the feed end 30 and discharge end 32 respectively of chamber 22. Chains 80 are double stranded at 85 and 87 and sprockets 82 and 83 are preferably likewise of double construction with the teeth on the outer side (FIG. 9) removed to accommodate driven sprockets 132 to be more particularly described hereafter. Though sprockets 82 and 83 with a single set of teeth would function adequately, the double arrangement with the outer teeth removed is preferred in order to provide support between the smooth, toothless outer surface of each double sprocket 82 and 83 and the ends of the teeth of sprockets 132 as a bar assembly moves from top to bottom at the ends of chamber 22 in a manner to be described. Each pair of sprockets 82, 83 are conventionally keyed to chain drive shafts 84 and 89 suitably journaled for rotative movement in bearings mounted in blocks in side panels 12a and 12b. Suitable well known devices may be used to maintain tension in chains 80. Also, conventional means such as a variable speed motor 270 (FIG. 9) operatively connected to shaft 84 is provided to rotate the latter. Optionally includable (FIGS. 2 and 7) at the discharge end of upper course 26 are friction wheels 96 secured to each sprocket 83 and having resilient discs 100 for contacting the underside 102 of a bar assembly 48 at each end as it moves downwardly from upper course 26 toward lower course 28 of chamber 22.

Means including members such as 86 (FIGS. 1-3) secured to side panels 12a and 12b form opposing endless guideways 88 with such side panels on either side of chamber 22. Portions of such members 86 are cut away as at 91 in FIG. 3 to accommodate wheels such as 135 and 140 to be further described. Each housing 48 (FIG. 3) is provided at opposite ends with stub shafts 90 outwardly projecting from housing extension 92 toward guideway members 86 having means such as rotary followers 94 thereon for continuous, bar assembly-supportive movement in guideways 88 during travel of a bar assembly 48 along the full length of upper course 26 and lower course 28 of chamber 22. Guideways 88 stabilize each bar assembly in the vertical direction during movement through chamber 22 and prevent disengagement of sprockets 132 from the links of unsupported chains 80 as the latter rotate around in an endless path. Guideways 88 are preferably vertically positioned such that chains 80 move underneath sprockets 132 in top course 26 and above such sprockets in bottom course 28 in order to facilitate adding and removing bar assemblies to the system in a manner to be described.

As illustrated in FIG. 6, and preferably at a portion of guideway 88 located along the lower course 28 of chamber 22 in the area generally identified as 108 in FIG. 1, a lower portion 110 of the guideway defining member is detachably mounted on each side of the chamber, via a set screw 112 and pivot pin 113, with respect to immediately adjacent portions 114 and 115. This is for the purpose of opening guideway 88 in such area 108 for insertion of bar assemblies 48 into the system. The particular size 117 of the opening is preferably maintained only a few thousandths greater than the horizontal distance between the outer extremities of follower pairs 94 of a bar assembly 48 in order to insure accurate aligned positioning of a bar assembly with respect to chain 80 during insertion, i.e. no cocking. Guideway 88 can be made operable as just described at any point along its length, such as, for example, at the feed end 30 of the chamber where the assemblies 48 can be added by merely seating bosses 146 in an opposing pair of slots 210 in wheels 204, 206, to be further described.

As an important feature of the invention, rotary means generally indicated as 120 in FIG. 3 turn parts 50 about their vertical axes 122 during travel along paths 39, such means being operatively interconnected, as typically illustrated on the left side in FIG. 3 with the outer strand 87 of each chain 80 of the advancing means and with each bar assembly 48. Rotating means 120 includes shaft 74 extending crosswise through the rearward end of each housing 54 having spaced, spiral flight portions or worm sections 128 either integrally formed with such shaft or separately fastened thereon, for meshing engagement with teeth 130 of each annular pinion 64 of a bar assembly. A pair of small driven sprockets 132 are pinned at 81 (FIG. 5) to extension 83 which in turn is secured at 85 to opposite ends of shafts 74. Sprockets 132 meshingly engage the links of strand 87 as illustrated in FIG. 4. Thus, as shaft 74 rotates, worm portions 128 in meshing engagement with teeth 130 of pinion 64 cause pinion 64 and consequently part-support member 56 secured thereto to rotate in unison.

Metering means generally at 134 in FIG. 7 at discharge end 32 control the inventory of assemblies 48 in the upper course 26 and more specifically sequentially release bar assemblies from upper course 26 to lower course 28. Such metering means includes (FIGS. 2 and 7) a pair of upper metering wheels 135 mounted on opposite ends of shaft 138 journaled in extensions of the side panels for rotary movement. A pair of lower metering wheels 140 are on shaft 141 which is similarly journaled for rotary movement. Each pair of metering wheels 135 and 140 have circumferentially spaced radially extending slots 143 and 145 (FIG. 7) for cooperating with a boss 146 (FIG. 4) on the end of stub shaft 90 at either end of bar assembly 48. Each pair of bosses first releasably engages a pair of slots such as 143 in upper metering wheels 135 and subsequently in slots such as 145 in lower metering wheels 140. Drive means for such wheels is generally indicated as 150 (FIG. 1). In the illustrated embodiment, the prime mover for such drive means 150 preferably is part of the drive train for molding equipment downstream of apparatus 10, which for example, is connected directly to shaft 152 in FIG. 1. Means 150 in the illustrated embodiment includes a gear box 154 driving sprocket 158 on metering wheels intermediate shaft 160, which in turn drives lower metering wheel sprocket 165 via chain member directly transferred to upper meter wheel sprocket 165 via chain member 167 such that both wheels rotate at the same speed. Metering means 134 further includes curved, parts-guide member 169 (FIG. 7) between the upper and lower metering wheels situated outwardly of chain drive sprockets 83 and extending across the width of chamber 22 for supporting parts 50 as they move between the upper and lower courses of the chamber in a manner to be described.

Gate means (FIGS. 7 and 8) generally indicated as 171 at discharge end 32 on the lower course 28 of chamber 22 release parts 50 from each bar assembly in a controlled manner as the latter moves along guideway 88 between the upper and lower metering wheels. Movable hopper means 156 (FIG. 1) beneath gate means 171 (FIG. 8) receive parts 50 in hoppers 163 on being released. Hoppers 163 are mounted for rotary movement about a central main shaft 158 which is driven from downstream molding equipment, not shown.

Gate means 171 (FIG. 8) comprise a series of slide gates 164, one for each path 39, with each being attached to a rod 166 reciprocable as at 168 by means of pressurized air selectively admitted to cylinders 256 housing a conventional piston on the end of each rod 166. By reciprocating gate member 160 rearwardly to the left, a part 50 drops by gravity into a hopper 163 passing beneath it. Gate members 164 must be reciprocated according to a predetermined pattern in order that the linearly arranged forwardly moving preforms in each bar assembly drop into the circularly moving hoppers 163 at the proper time. Such predetermined sequence may be controlled by suitable conventional electric switches and multi-port solenoid valves in the air supply line feeding each cylinder 256 of the gate means 171. Box 173 (FIG. 7) houses such switches. A single solid gate member for releasing the entire preform contents of a bar assembly at once may be used with alternative types of parts takeaway means other than those employing individual hoppers as in the illustrated embodiment.

Figure 2:
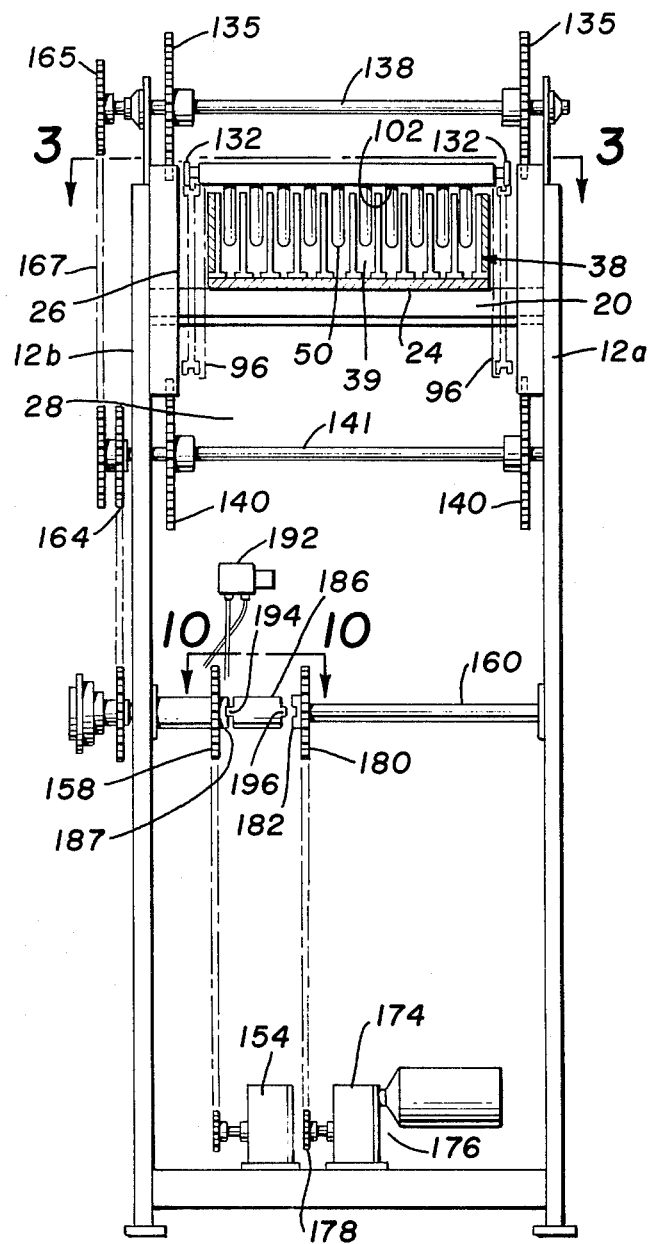
FIG. 2 is a vertical, sectional view of the discharge end of the apparatus taken along 2—2 in FIG. 1.
Figure 10:
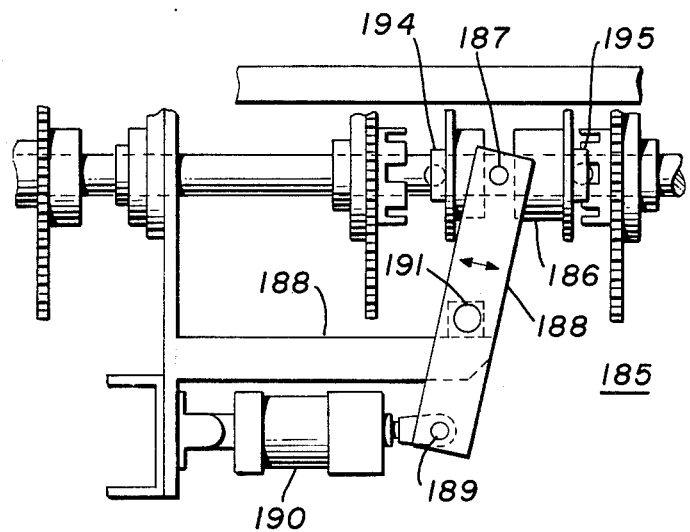
FIG. 10 is a plan view taken generally in the direction 10—10 of FIG. 2.

Referring now to FIG. 2, auxiliary drive means 174 may be provided for rotating the upper and lower metering wheel pairs 135 and 140 which is automatically electrically actuated when the main drive from the downstream molding equipment is de-energized, for example, due to a process malfunction. Such auxiliary drive means 174 comprises a conventional motor and gear box assembly 176, drive sprocket 178 and driven sprocket 180 secured to a driven dog member 182. Member 182 and sprocket 180 together are journaled for free rotary movement about shaft 160 when the main drive acting through gear box 154 is turning the metering wheels. Clutch assembly 185 of the metering wheel drive means, in operative communication with sprockets 158 and 180 determines which of such two members will transmit motion to metering wheels intermediate shaft 160. Such clutch assembly comprises reciprocable drive dog member 186 slidably keyed to intermediate shaft 160 and secured at 187 to arm 188 which in turn is secured at 189 to pneumatic cylindrical assembly 190. When functioning, air fed to assembly 190 through four-way solenoid valve 192 pivots arm 188 about 191 to cause member 186 to slide either right or left in FIG. 10. Thus, when the downstream molding equipment and movable hopper means 156 are operating, thereby driving shaft 152 (FIG. 1) and wheels 135 and 140 through gear box 154, projections 194 (FIG. 2) of drive dog member 186 are engaged in opposing slots in driven dog member 187 secured to sprocket 158. When such hopper means 156 of the downstream molding equipment is deactivated, valve 192 is energized to pneumatically reciprocate drive dog member 186 to the right in FIG. 2 toward auxiliary drive means 174, bringing an alternate set of projections 196 into engagement in opposing cooperating slots of auxiliary drive driven dog member 182. Motor 176 of the auxiliary drive means is also electrically energized under these conditions by suitable conventional means to eventually transmit power to the metering wheels independent of such downstream power source. Should the slots in the driven dog members 182 and 187 be out of exact alignment with projections 194 and 196 during such switchover, the projections will momentarily slide on the surfaces of members 182 and 187 between the slots until alignment exists whereupon they will forcibly enter the slots to engaging position under the influence of the pressure exerted by assembly 190. When auxiliary drive means 174 functions, each gate member 164 via suitable electric interlocks remains shut and consequently each part 50 in a bar assembly 48 as it moves downwardly after being released by the upper metering wheels 135 to the lower metering wheels 140, is dragged across the closed gate members (FIG. 1) and then drops by gravity into parts collection means 198 (FIG. 7) beneath discharge end 32 of chamber 22 and adjacent movable hopper means 156. Such parts collection means 198 may include a contoured chute 200 to direct the falling parts toward a central scrap recovery and reprocessing area, not shown. With such an auxiliary drive means and parts collection system, an accumulation of workpieces in the apparatus due to a stoppage of the main drive means for turning the metering wheels should not occur. Parts 50 can continue to be supplied in the normal manner to the system until the downstream equipment is cleared and ready to accept conditioned parts once again.

Figure 9:
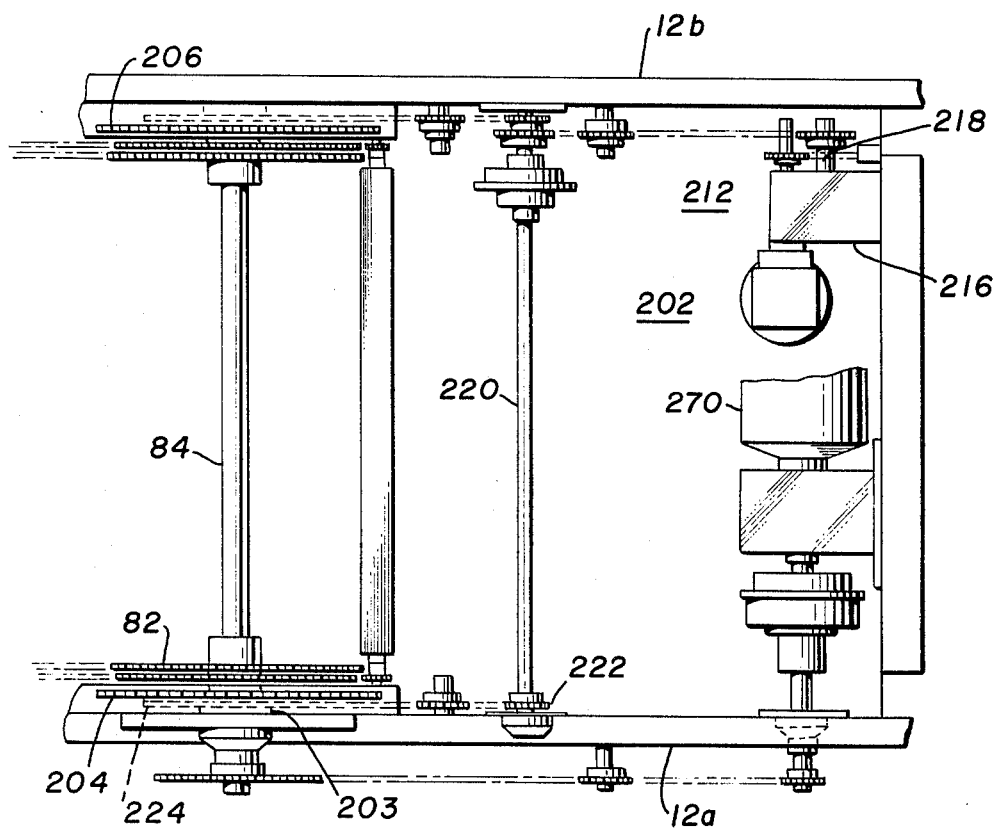
FIG. 9 is a view similar to FIG. 2 of the feed end of the apparatus taken along 9—9 of FIG. 1.

At the feed end 30 of chamber 22 infeed means generally indicated as 202 (FIG. 9) admit each bar assembly 48 at regular intervals to the parts charging station and then to upper course 26 of chamber 22 in a manner to be described. Infeed means 202 comprises a pair of laterally spaced escapement wheels 204 and 206 journal mounted such as at 203 to main chain drive shaft 84. Each escapement wheel 204, 206 have forwardly directed, spaced radially extending slots 210 (FIG. 1) formed in the periphery thereof similar to those in the metering wheels at the other end of the apparatus. The same previously described boss 146 at each end of a bar assembly 48 seats in slots 210 in each of the escapement wheels 204 and 206 when the bar assembly is being held at the feed end 30 during loading. Power means generally indicated in FIG. 9 as 212 are provided for cyclically rotating wheels 204 and 206 and includes limit switch 214 (FIG. 7) conventionallyelectrically interlocked with indexing drive mechanism or intermitter 216 (FIG. 9). Such an intermitter is commercially available and conventionally houses cam and gearing mechanisms which define the amount of rotary movement per cycle and includes drive output shaft 218 for rotating indexing drive intermediate shaft 220 journaled for rotation in suitable bearing blocks. Pinion 222 at the opposite end of shaft 220 cooperates with a suitable chain or belt member which drives escapement wheel sprocket 224 which is secured to escapement wheel 204. Thus, though chain drive main shaft 84 is continuously rotating via power input from motor 89, escapement wheel 204 cyclically rotates with respect to shaft 208 independent of movement of the latter. A similar drive assembly on the right hand side in FIG. 9 as just described is employed to rotate escapement wheel 206 from intermitter 216 and shaft 220. Thus, limit or micro-switch 214 by contact of its arm 226 (FIG. 7) with each bar assembly passing between the upper 135 and lower 140 metering wheels electrically activates the motor portion of intermitter 216 to rotate output shaft 218 a preset amount sufficient to lift an empty bar assembly from the right hand end of lower course 28 upwardly via engagement of bosses 146 in slots 210 in the escapement wheels into the loading station at feed end 30.

Figure 11:
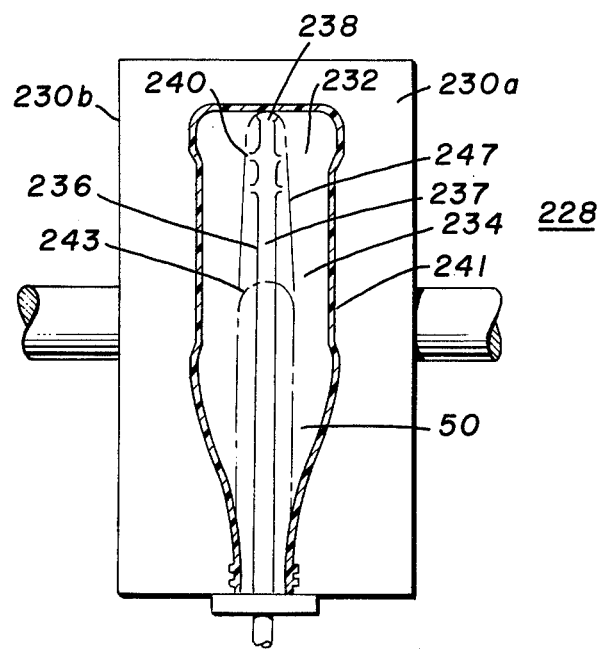
FIG. 11 is a vertical, schematic view of a molding station downstream of the apparatus of FIG. 1.

In FIG. 11, molding station generally indicated as 228 includes opposing mold sections 230a and 230b closable on each other in conventional manner to form cavity 232 having a periphery conforming to that of a hollow article, such as bottle 241. Cavity 232 through illustrated in an upside-down position may alternatively be positioned right-side up. Stretch and blow assembly 234 cooperates with sections 230 and includes an extendable stretch rod member 236 having a shoe portion 238 on its forward end and is reciprocably mounted by suitable means in an opening at one end of cavity 232. Rod member 236 has an interior passage 237 opening into air outlet ports 240 for admitting air under pressure to the interior of a molded part 50 either during or subsequent to stretching the closed end of such part 50 against the base of cavity 232.

In operation, previously molded, preforms 50 each having an overall contour which is generally symmetrical about its axis 122 and preferably having a closed end 243 and a finish portion 242 which in the illustrated embodiment includes spiral threads (FIG. 4) and step 60 immediately below such threads, are provided to apparatus 10. Preforms 50 may be at room temperature or alternatively and preferably will have been discharged from an injection or blow molding station a few momemts before and consequently will be at a somewhat elevated temperature. In any event, it is desired to bring the thermoplastic material preferably constituting body portion 244 of each preform 50 to within a temperature range at which substantial molecular orientation can be developed on stretching. Such range may broadly be defined as that from the glass transition temperature of the polymer forming the thermoplastic material at the lower end of the range up to a temperature at which melt flow of the polymer can occur. Within this broad range, it is preferred to develop such substantial molecular orientation at temperatures from 25° to 100° F. above the glass transition temperature of the polymer to avoid the need for excessively high forces on the one hand to stretch the polymer at the lower end of the broad range and on the other hand, to avoid rapid relaxation of stresses developed on stretching at the upper end of the broad range. Apparatus 10 has been found especially useful when body portion 244 though varying in temperature through its thickness, does have portions toward its interior which are at temperatures greater than those at which substantial molecular orientation can be developed, and accordingly it is necessary to decrease such temperature(s) prior to reshaping the preform into a finished molecularly oriented article.

Preforms 50 are loaded at the charging station at feed end 30, either automatically or manually, into the sockets formed by each partsupport insert 56 of a bar assembly 48, while each such assembly temporarily dwells, usually for a matter of a few seconds, in the loading station, i.e. at substantially a 12:00 o'clock position with respect to escapement wheel 204, FIG. 1. As indicated in FIG. 4, each loaded preform is supported in suspended relationship against collar 58 of insert 56, with the preforms in a particular bar assembly forming a linearly oriented collection of same extending perpendicular to the centerline of chamber 22. Though preforms 50 might be positioned in the system with closed ends 243 uppermost, the reverse is preferred both to minimize handling in subsequent operations as will be apparent hereafter, and to avoid sagging of the weight of the body portion 244 back on the finish portion 242 when the preforms are at elevated temperature.

After each bar assembly 48 has been loaded, it being understood that each position therein need not be filled, it is released from the loading position by rotation of escapement wheels 204 and 206, such that bosses 146 which has been seated in engagement with the walls of slots 210 are free to move out of such slots under the influence of continuously advancing chains 80 and the sprockets 132 at opposite ends of each bar assembly which are seated in the outer strand 87 of such chains. Thus, as a bar assembly starts along the initial portion of chamber 22, no relative movement exists between it or any or its components and the chains conveying it forward toward the discharge end of the assembly. Each assembly is being propelled forward relatively fast at this point in the process at the same speed as that of chains 80. No heat transfer to any substantial extent with respect to preforms 50 occurs during this portion of the process, and as a matter of fact, depending on residence time requirements, the heat transfer unit 21 closest feed end 30 may be eliminated altogether or medium circulation through an existing such assembly merely shut off until necessary.

When the most recently released bar assembly reaches the prior one in chamber 22 under the conveying influence of chains 80, it gently strikes the rear surface thereof which serves as an abutment against further advancement at chain speed, and at this point, relative movement commences between sprockets 132 of rotating means 120 and the continuously moving chains, while roller followers 94 rollingly support the loaded bar assembly in guideways 88, as has occurred from initial introduction of the loaded assembly into the system. The ring of teeth of sprockets 132 enter and exit the spaces within the links of the outer strands 87 of advancing chains 80 to thereby rotate shaft 74 and worm sections 128 which in turn mesh with the teeth of each pinion 64 to rotate the latter as well as part-support carrier 56 keyed thereto which, as described, is frictionally holding a preform 50 on collar 58. Each preform then is rotated with carrier 56 with respect to its bar assembly 48 by such motion of shaft 74 about its vertical axis 122 while supported and suspended in an assembly 48 as the latter continues to be conveyed forwardly toward the discharge end of the apparatus. The actual rotary speed of a preform is the difference between the peripheral speed of metering wheels 135 and 140 which is synchronized with that of downstream equipment as will be further described (or the speed at which assemblies 48 are moving) and the speed of the moving chain, the former necessarily being less than the latter to permit such rotary movement. Accordingly, if it is desired to change the rotary speed of the preforms during conditioning, this can be done by changing the chain or metering wheel speed or both depending on whether it is desired to rotate faster or slower. Preferably, chain speed is changed via variable speed drive motor 270 since this avoids adjusting metering wheel speed and thus that of downstream molding equipment which can remain constant. It is during this portion of the path of travel of the preforms where rotary movement occurs and which usually represents about ⅔ of the overall length of chamber 22, that the intended design heat conditioning of the preforms takes place.

If it is desirable, for example for equipment for layout putposes, to set apparatus 10 on an incline, i.e. canted upwardly, frictional force may be generated to prevent a shaft 74 from rotating in place on chains 80 as a bar assembly 48 is being freely conveyed forwardly and upwardly at chain speed prior to abutment against the previous assembly, by merely manipulating adjusting screw 73 to create whatever force is desired for urging shoe member 68 against collar 72 which is fixed to shaft 74.

As each assembly 48 moves forwardly, the rotating body portion 244 of each of the plurality of preforms 50 moving in parallel passes between a pair of adjacent heat transfer panels 38 along path 39. It is preferred that each preform in a bar assembly be assigned to a single path although it is within the scope of the invention to widen the paths and pass two or more preforms between horizontally adjacent panels. When this is done, however, the time to bring a preform at a given starting temperature pattern to the desired end temperature will be increased for a constant temperature heat sink and consequently the length of the apparatus would have to be increased to provide more heat transfer surface. Also, if the number of preforms per path or channel is increased excessively, in a cool-down process heat will be transferred from one preform to the next and then eventually to the panels rather than the preferred more direct approach. During movement of the parts through the apparatus, it should be noted that in the embodiment of the drawings, finish portion 242 of each preform which does not require any further reshaping, is snugly confined within its socket 56 above the tope of panels 38 (FIG. 2) and consequently is shielded from exposure to the panels during advancing movement of each bar assembly. As a matter of fact, the atmosphere around the finish portions 242 may have a cooling and hardening effect on the plastic, since it is above the panels 38 and relatively free to circulate to the surroundings via the open ends and bottom of the apparatus. Also, when the various parts of assemblies 48 are formed of a low heat conductive material such as the previously described phenolic plastic, heat transfer back to finish portion 242, which is preferably cooler at the start of the process than body portion 244, is minimized.

Rotative movement of each preform 50 as it traverses path 39 averages out exposure of the thermoplastic material of each body portion to the panel surface and eliminates edge effects otherwise present along the leading and trailing surfaces of the preforms. Every point in each body portion 244 is exposed over a period of time to a uniform temperature heat sink provided by the three individually closely controlled heat transfer assemblies 21 to bring the thermoplastic material to within the temperature range at which substantial molecular orientation occurs on stretching. In a cool-down process, this results overall in heat being removed by radiation from the preforms to the surface of panels 38 and then to the particular medium circulating through channels 40 which may, for example, be oil or water. In a cool-down process, the heat transfer medium nevertheless should be heated to about 150° to 220° F., to control the temperature gradient between inner and outer surfaces of the preform body 244, a smaller gradient being desirable to facilitate the ease by which optimum orientation temperature is developed in the material. Conventional equipment well known to those in the art may be utilized to control the temperature of the medium, for example, to within about ± 1° F. between the inlet and outlet to a particular bank of panels 38. In the illustrated embodiment, oil is fed from a manifold in parallel to the bottom of each of eleven panels of a heat transfer assembly, with flow being upwardly through passages 40 of each panel 38 to a second manifold where discharging oil is collected in parallel and piped back to the reservoir. Three such arrangements are employed in the illustrated embodiment with conventional temperature control instrumentation on each to permit varying, in a controlled manner, the temperature of the medium of one assembly versus another, if necessary.

When a bar assembly reaches the end of the single pass heat transfer zone, i.e. at the left end of panels 38 in FIG. 7, the continuously turning upper metering wheel pair 135 rotate downwardly through cutaway portions 91 in guideway defining members 36 to bring slots 143 into momentary engagement with followers 146 on either end of the heat transfer zone. The pitch 250 (FIG. 7) or centerline distance between adjacent slots 143 is equal to the centerline distance between bosses 146 in two abutting bar assemblies, to provide for precise engagement of successive slots and bosses during rotation of wheels 135. The same pitch distance between slots and bosses is likewise maintained for the same reason with wheel pairs 140 and 204. As a particular pair of slots containing bosses 146 turns through a portion of the lower arc in FIG. 7 of wheels 135, the engaged bar assembly is metered forward and freed by the continued upward movement of the slot pair. As the followers exit a slot pair 143, in order to prevent each bar assembly from free falling by gravity between the top and bottom courses of chamber 22 and thereby possibly distort the soft parts 50 therein, discs 100 of friction wheels 96 engage the underside 102 of each assembly urging followers 94 outwardly against the surface of the outer guideway forming member, thereby carefully but relatively rapidly to avoid preform sag, guiding the assembly between the courses at chain speed. As each assembly is thus turned downwardly, preforms 50 abut guide member 169 which prevents them from sliding out of the bar assemblies as a result of such upending turning movement.

As the bar assembly approaches bottom course 28 of chamber 22, each preform passes along guide member 169 and gradually assumes an inverted position while partially sliding out of its opening in the bar assembly until the surface defining the open end of the top of the finish comes into contact with the upper surface of a reciprocable slide gate 164. Accordingly, each preform is temporarily supported (FIG. 7) on end in an upended position while still in a bar assembly continuously moving without interruption except now in an opposite rearward direction.

Considering now the embodiment of FIG. 8, when the hoppers for accepting the preforms are continuously moving in a circular path, and the linearly arranged preforms in a bar assembly are moving in a linear direction, the preforms should be released by gate members 164 according to a predetermined drop sequence, i.e. as close as possible to the precise moment the axis 122 of a preform 50 is coincident with that of a hopper 163. In other words, as bar assembly 48 moves forward in the direction of arrow 252 in FIG. 8 radially to the rotary path of hoppers 163, at a given time a particular hopper will be under a particular linearly arranged preform depending on the position of the bar assembly. The drop sequence can be readily specified for any particular combination when the speeds of the bar assemblies and hoppers are known, and it may turn out for certain combinations that two or more preforms should be dropped simultaneously. Accordingly, when the hopper for a preform resting on a particular gate member 164 in the illustrated embodiment is beneath such gate member, the latter is automatically reciprocated rearwardly via the piston and cylinder 256 so as to allow the preforms to drop by gravity out of the bar assemblies into individual hoppers. Specification of optimum drop pattern is important for the linear-rotary movement of the components of the illustrated embodiment, since the further away the axis of a preform is from that of its hopper 163 at the precise moment of drop, the greater the necessary width in the direction 254 (FIG. 8) of a hopper, and as hopper width is increased, so likewise is the tendency for the soft, dropped part to tip and hang up in the throat at the lower end of the funnel-shaped hopper 163.

The temperature-conditioned preforms are then transferred, either automatically or manually or by combinations thereof, to molding station 228, FIG. 11. Sections 230 are closed around it, stretch-blow assembly 234 brought into position such that rod member 236 is inserted into the open end and then actuated by suitable means to increase the length of body portion 244 as at 247 via forced contact of foot 238 against the inner surface of the closed end to thereby stretch the plastic and develop longitudinal or axial orientation. In the preferred procedure of the illustrated embodiment, after contact (or just prior thereto) of the outer surface of the closed end of the preform with the opposing wall of the mold cavity 232, air under pressure is admitted through ports 240 to expand it outwardly in a radial direction against the cavity walls to form the article and develop radial orientation. Axial and radial stretching, however, may be carried out simultaneously under certain conditions, e.g. when pronounced axial orientation is felt unnecessary.

Returning now to the bar assemblies, after the parts are released, and after having been metered out of the area between upper and lower wheel pairs 135 and 140 by the latter, they are recycled via chains 80 and sprockets 132 at chain speed in the opposite direction along open-bottom lower course 28 to feed end 30. Metering action via lower wheels 140 is the same as previously described for the upper pair 135. Preferably no backup of loaded assemblies in the turn between the two pairs is allowed during operation in order to avoid having the soft, deformable parts sag under their own weight which tends to occur when the preforms are oriented other than in a vertical attitude. In so moving rearwardly each bar assembly continues to be supported in guideway 88 via rollers 94.

As previously indicated, micro-switch 214 positioned in the path of downwardly turning bar assemblies at the discharge end of the assembly between the upper and lower metering wheel pairs electrically energizes intermitter 216 which causes escapement wheels 204, 206 to turn through an arc of about 180 degrees so as to revolve the next empty bar assembly via engagement with radial slots 210 and bosses 146 upwardly from beneath the heat transfer panels into position at the loading station for receipt of additional preforms to commence another cycle. Thus, during an operating cycle of a bar assembly it traverses a closed path within the apparatus 10.

Regarding the variable conditioning time feature, the continuous rate of discharge of parts from the system via synchronously operating metering wheels 135 and 140 is preferably set slightly less than the feed rate such that an accumulation of successive loaded bar assemblies exists in the heat transfer zone as generally indicated at 249 in FIG. 1, preforms, for simplicity purposes, not being shown in FIG. 1 in each and every bar assembly 48 in upper course 26. The portion of the total length of paths 39 occupied by the accumulation 249 of loaded bar assemblies for a given set of feed and discharge conditions may be considered to be the effective heat transfer length of the total zone within chamber 22. Similarly, a reservoir of empty assemblies is established at the end of lower course 28 adjacent and beneath the charging station as illustrated at 250 in FIG. 1. The latter may be accomplished by manually adding empty assemblies to the system via the operable portion of the guideway previously described with reference to FIG. 6. Thus, in area 108 rearwardly of the empty bar assembly reservoir, pivotable section 110 is released downwardly and empty bar assemblies then inserted upwardly through the opening into place such that followers 94 are seated in guideway 88, whereupon the assembly is manually pushed away toward the loading station to be then conveyed forward as previously described via engagement between sprockets 132 and the links of chains 80. Such added bar assemblies then becomes part of the accumulated reservoir and are eventually turned up into the loading position by the escapement wheels. Thus, by varying the effective length of the path of exposure of assemblies 48 to panels 38 (i.e. 249 in FIG. 1) by manipulating empty assemblies, residence time in chamber 22 of successive groups of parts can be changed while keeping the continuous discharge rate of parts from the assembly and the temperature of the heat transfer panels essentially constant, and maintaining as well the fixed position of the parts with respect to each other both along and across the chamber. Such variability avoids processing disruptions which occur while waiting for equilibrium to be re-established when it is elected to vary heat transfer by changing the temperature of the conditioning medium. When the rate at which empty bar assemblies are metered from reservoir 251 into the loading station equals the continuous rate of metering out of area 249, a steady state condition exists. Should the starting temperature of the preforms being fed to the system change, for example, such that it is desired to change temperature conditioning time accordingly, a conventional electrical override circuit may be manually energized to cycle intermitter 216 independently of micro-switch 214. Increasing cycle frequency in this way increases the rate at which bar assemblies are presented to and discharged from the charging station from reservoir 251 such that it exceeds the undisturbed rate of continuous metering of loaded bar assemblies out of the heat transfer zone, thereby increasing the number of and therefore the residence time of bar assemblies and of subsequently introduced parts in such zone. It may be necessary to temporarily interrupt the feed to the system when empty bar assemblies are being added to the upper course in this way, or alternatively, they might be quickly cycled through the charging station while the group of preforms which will occupy the nest assembly are being collected. In this latter respect, interruption of upstream processing steps is avoided. When the reverse is done, i.e. the rate of metering of bar assemblies into the zone is less than the rate of continuous metering out of the zone, the eventual length of accumulation 249 is decreased at the expense of an increase at 251 and therefore the residence time of bar assemblies and of subsequently introduced parts in the heat transfer zone 249 is reduced.

The wall of the body of preforms 50 may contain uneven thickness sections in the circumferential direction, as illustrated by opposing thick and thin portions 253 and 255 respectively in FIG. 4, formed, for example, when the preforms have been molded by blowing. Preforms which have just been blow molded possess a particular temperature pattern, i.e. an outer layer or skin of the body portion which had been in direct contact with a chilled mold surface is at a lower temperature than the portions of the wall inward of such outer skin, and since thin portion 255 will have been cooled more than thick portion 253, the overall temperature of the former will be lower than that of the latter. In shaping a hollow molecularly oriented article from such preforms wherein improved uniformity of wall thickness is desirable, the temperature of the body portion should be reduced before stretching as described, but in so doing, it is important to maintain a relative temperature difference between opposing thick 255 and thin 253 sections in the uneven wall thickness preform. When such difference exists, thin, cooler section 253 will stretch less than the opposing thick section 255 during reshaping in the molding station thereby improving the relative evenness in wall thickness in the finished article and compensating for the unevenness in the initial preform. Stated differently, during conditioning in the apparatus of the invention of a preform having a wall thickness material distribution as illustrated in FIG. 4, development of a uniform temperature in the body portion during passage through the conditioning zone is purposely avoided in order to maintain a temperature differential between thick and thin sections of the body during subsequent stretching and blowing. With an even temperature in both thick and thin sections, the thinner section having a melt strength less than the thicker stretches more and is reduced even further in thickness during forming of the article, this severely hindering subsequent performance of the article in use especially when in the form of a container such as a bottle. Such maintenance of a temperature gradient, however, is unnecessary and preferably avoided in favor of a constant temperature throughout when the thickness of the preform wall is substantially even in the circumferential direction.

EXAMPLE

Thermoplastic material comprising a polymer of 70/30 weight percent acrylonitrile/styrene was extruded at a temperature of about 475° F. through a conventional annular orifice in the usual way as shown in U.S. Pat. No. 3,754,851 to form a tubular parison. Sections thereof were thereafter enclosed in a blow mold and expanded outwardly against cooled walls at about 40° F. of an internal cavity to form preforms of the type illustrated at 50 in FIG. 4, the uneven thickness being determined by sectioning the preforms and noting wall distribution. After retention in the mold for a few seconds to allow the plastic of at least an outer skin portion (and generally also the portion just beneath such skin) to set, the parts were ejected and waste flash immediately removed. The preforms were then immediately inserted in holders and cylindrical shrouds placed around them spaced outwardly from the walls thereof, for the purpose of creating a quiescent environment undisturbed by the surroundings, and in order to permit the plastic through the full body wall to come to a temperature equilibrium wherein no substantial variation through the thickness existed. In so doing, it was expected that the chilled outer surface portions would be slowly conductively reheated by the adjacent, inner high temperature wall portions with the latter accordingly falling in temperature until eventually the full wall thickness would be at a temperature which did not vary appreciably from outer to inner surface. The shrouds were periodically removed from around the preforms and the latter rotated in front of an infra-red sensor of a model 4010S temperature indicating system manufactured by Williamson Corp., 1152 Main Street, Concord, Mass. Surface temperature readings thus obtained increased slowly to an average to about 285° F. after 3.5 min., such temperature having been previously determined as being within the range at which substantial molecular orientation could be developed in the nitrile-based thermoplastic material of the preforms. When such temperatures were reached, the preforms were immediately enclosed in a mold and stretched and blown into bottles such as at 241 in FIG. 11, which were intended to be used to package liquids under pressure. The blown bottles thereafter were filled with water, capped and dropped on a flat surface from a height of 18 inches. Others filled and capped in the same manner were subjected to an incrementally increasing pressure in the space above the liquid until the bottle burst at which point the burst pressure was noted. This run and tests are considered herein to serve as a control.

Preforms manufactured as just described, were passed through the apparatus of the invention with the temperature of the heat transfer medium controlled at about 160° F. and immediately thereafter stretched and blown into bottles. The type of polymer, preform shape and total weight and mold shape were identical with the control.

The bottles formed initially were sectioned in the area of greatest diameter perpendicular to the bottle axis and the wall thickness, as measured by micrometer, determined to vary substantially from side to side, typically from 50 to 60%. The time of heat transfer exposure to the heating panels of preforms being continuously conditioned in this way was then gradually reduced over a period of time by slowing the rate at which empty assemblies are presented to the loading station, thus decreasing the effective length of loaded bar assemblies in the conditioning zone. As residence time was empirically decreased in this manner, circumferential variability in wall thickness in the sectioned bottles decreased to a level of 10–15%. When such conditions of minimum variability which reached, burst and impact tests were carried out as previously. The results were as follows:

| Run | Test | |
|---|---|---|
| | Impact No. Passing | Burst Press. psi |
| Control - even temp. developed | 3 of 12 | 120 – 145 |
| Invention - uneven temp. maintained | 19 of 20 | 150 – 162 |

With respect to the run providing minimum finished bottle wall thickness variation according to the invention, as indicated, the initial temperature profile of the suspended preform body is such that the outer surface temperature is relatively low and increases through the wall toward something somewhat below the initial extrusion temperature at the inner surface, with the average overall wall temperature being substantially greater than that desired for developing substantial orientation. It is postulated that the preform with such a profile and wall thickness pattern initially liberates equal heat at the beginning of cool-conditioning. Then as heat is liberated, the thin part with less heat capacity becomes cooler with the thick part, though loosing temperature, remaining hotter because of its greater heat capacity, so that before such pattern can change by the body remaining exposed too long to the heat sink, it is stretched and blown to achieve a finished article of substantially uniform thickness without overly thin spots which create failure sites when impacted and pressurized. The average overall temperature gradient between opposing thick and thin sections just prior to stretching and blowing is postulated to be from 6° to 20° F.

Thus the technique of the instant invention wherein a temperature differential is maintained between thick and thin portions of an uneven thickness preform to be molded into a container is shown to be superior to the technique of equilibrating the full wall thickness to the same temperature prior to molding.

Various modifications and alterations of the invention will be readily suggested to persons skilled in the art. It is intended therefore, that the foregoing be considered as exemplary only and that the scope of the invention be ascertained from the following claims.

What is claimed is:

1. A process for temperature-conditioning elongated molded parts which comprises:
   a. supporting each of a plurality of elongated preforms made of thermoplastic material at a step adjacent one end in suspended side-by-side relationship in consecutively presented part-supporting assemblies at a charging station;
   b. passing the preforms while supported in the assemblies in one direction along a series of generally parallel paths between adjacent heat transfer assemblies;
   c. rotating the preforms about their vertical axes during movement along said paths;
   d. transferring heat between said preforms and heat transfer assemblies as the preforms traverse said paths to bring major portions of the lengths of such preforms extending downwardly between said assemblies to within a temperature range at which substantial molecular orientation occurs on stretching;
   e. discharging said preforms from said assemblies after traversing said paths without any blow molding of said preforms after heat transfer and before said discharge; and
   f. recycling said assemblies after discharge of said preforms in the opposite direction substantially parallel to said one direction back to the charging station without passage through an intermediate preform processing station, to receive additional preforms.

2. The process of claim 1 wherein heat is removed by the heat transfer assemblies.

3. The process of claim 1 including the step of reciprocating a series of gate members away from beneath discharge thereof by gravity.

4. The process of claim 1 wherein during step (d) the temperature of the preforms is increased from substantially room temperature to within said range at which substantial molecular orientation occurs on stretching.

5. The process of claim 1 wherein during step (d) the temperature of the preforms is decreased from an elevated temperature to within a range at which substantial molecular orientation occurs on stretching.

6. The process of claim 1 wherein only one preform of each side-by-side positioned plurality is present per path during movement of each such plurality along said paths.

7. The process of claim 1 wherein step (e) occurs by simultaneously discharging the entire preform contents of each assembly downwardly after traversing said paths.

8. A process for temperature-conditioning thermoplastic preforms, each of which has a finish portion and an elongated tubular body portion with a closed end, said process comprising:
   a. supporting each of a plurality of said preforms which are at substantially room temperature at a step adjacent one end in suspended side-by-side relationship in consecutively presented part-supporting assemblies at a charging station;
   b. passing the preforms while suspended in substantially vertical position in the assemblies in a forward direction through a series of generally parallel paths, each of which is vertically circumscribed by horizontally adjacent, upright heat transfer assemblies arranged in said direction of movement, such that for a given assembly a major part of the body portion of a single preform only is within a path;
   c. rotating the preforms about their vertical axes during movement through said paths;
   d. transferring heat between said parts of the body portions and the heat transfer assemblies during movement through said paths to increase the temperature of such body portions to within the molecular orientation temperature range of the thermoplastic material forming said preforms substantially as a result of exposure to such heat transfer assemblies;
   e. discharging said preforms from said assemblies after movement through said paths without any blow molding of said parts after heat transfer and before said discharge; and thereafter
   f. recycling said assemblies in the opposite direction substantially parallel to said forward direction back to the charging station to receive additional preforms.

9. The process of claim 1 wherein step (e) occurs by simultaneously discharging the entire parts contents of each assembly downwardly at the ends of said paths.

10. A process for temperature-conditioning elongated parts which comprises:
   a. loading a plurality of said parts in side-by-side relationship into part-supporting bar assemblies consecutively releasably detained at a loading station;
   b. releasing each bar assembly from the station after loading with said parts;
   c. conveying the loaded bar assemblies along a heat transfer zone toward a discharge end thereof;
   d. continuously metering loaded bar assemblies downwardly at the discharge end out of the heat transfer zone;
   e. accumulating a series of successive, loaded bar assemblies in the heat transfer zone while continuing said continuous metering out of the heat transfer zone;
   f. releasing the parts from the bar assemblies at the discharge end after said downward movement;
   g. conveying empty bar assemblies in the opposite direction toward the loading station;

h. establishing a reservoir of empty bar assemblies upstream of the loading station; and i. sequentially metering bar assemblies upwardly from the reservoir into the loading station to accept additional parts.

11. The process of claim 10 wherein the rate of metering of bar assemblies into the loading station is equal to the rate of continuous metering of loaded bar assemblies out of the heat transfer zone.

12. The process of claim 10 wherein the rate of metering bar assemblies into the charging station exceeds the rate of continuous metering of loaded bar assemblies out of the heated transfer zone thereby increasing the residence time of bar assemblies and of parts supported therein in said zone.

13. The process of claim 10 wherein the rate of metering bar assemblies into the charging station is less than the rate of continuous metering of loaded bar assemblies out of the heat transfer zone thereby reducing the residence time of bar assemblies and of parts supported therein in said zone.

14. A process for temperature-conditioning thermoplastic preforms, each of which has a finish portion and an elongated tubular body portion with a closed end, said process comprising:

a. loading a plurality of said preforms at substantially room temperature in side-by-side relationship into consecutively presented part-supporting assemblies at a charging station;

b. passing the preforms while supported in substantially vertical position in the assemblies in a forward direction through a series of generally parallel paths, each of which is vertically circumscribed by horizontally adjacent, upright heat transfer assemblies arranged in said direction of movement, such that for a given assembly a major part of the body portion of a single preform only is within a path;

c. rotating the preforms about their vertical axes during movement through said paths;

d. transferring heat between said parts of the body portions and the heat transfer assemblies during movement through said paths to increase the temperature of such body portions to within the molecular orientation temperature range of the thermoplastic material forming said preforms substantially as a result of exposure to such heat transfer assemblies;

e. discharging said preforms from said assemblies after movement through said paths without any blow molding of said parts after heat transfer and before said discharge; and thereafter f. recycling said assemblies in the opposite direction substantially parallel to said forward direction back to the charging station to receive additional preforms.

15. The process of claim 14 wherein the paths are only slightly greater in width than that of the body portions of the preforms.

16. The process of claim 14 wherein during step (e) the entire preform contents of each assembly is simultaneously discharged downwardly toward adjacent in-line molding stations.

17. The process of claim 14 wherein during step (b) the closed end is below the finish portion.

18. The process of claim 14 wherein during step (b) the closed end is above the finished portion.

19. The process of claim 15 wherein the preforms are formed of a nitrile-based thermoplastic material.

20. The process of claim 19 wherein recycling of the assemblies occurs without passage through intermediate processing stations.

* * * * *

UNITED STATES PATENT AND TRADEMARK OFFICE
CERTIFICATE OF CORRECTION

PATENT NO. : 4,050,887
DATED : September 27, 1977
INVENTOR(S) : L. John Berggren, Charles L. D. Chin, and Joseph R. Reilly It is certified that error appears in the above-identified patent and that said Letters Patent are hereby corrected as shown below:

Col. 17, line 53, after "station" delete ",".

Col. 17, line 59, before "discharge" insert --- said parts to allow ---.

Col. 18, claim 9, line 45, cancel beginning with "9. The process of" to and including "said paths." in col. 18, line 47.

Col. 19, claim 14, line 22, cancel beginning with "14. A process for temperature" to and including "forms." in Col. 20, line 18.

Col. 20, claim 15, line 19, after "claim" delete "14" and insert --- 8 ---;
claim 16, line 23, after "claim" delete "14" and insert --- 8 ---;
claim 17, line 27, after "claim" delete "14" and insert --- 8 ---;
claim 18, line 29, after "claim" delete "14" and insert --- 8 ---.

Col. 20, line 30, after the second "the" delete "finished" and insert --- finish ---.

UNITED STATES PATENT AND TRADEMARK OFFICE
CERTIFICATE OF CORRECTION

PATENT NO. : 4,050,887
DATED : September 27, 1977
INVENTOR(S) : L. John Berggren, Charles L. D. Chin, and Joseph R. Reilly It is certified that error appears in the above-identified patent and that said Letters Patent are hereby corrected as shown below:

Col. 4, line 64, after "further" delete "decribed" and insert --- described ---.

Col. 6, line 24, after "of" delete "shafts" and insert --- shaft ---.

Col. 8, line 43, after "(FIG. 7)" delete "conventionallyelectrically" and insert --- conventionally electrically ---.

Col. 9, line 5, after "232" delete "through" and insert --- though ---.

Col. 10, line 61, after "about" delete "1/3" and insert --- 2/3 ---.

Col. 12, line 11, after "members" delete "36" and insert --- 86 ---.

Col. 14, line 58, after "the" delete "nest" and insert --- next ---.

Signed and Sealed this

Eighteenth Day of April 1978

[SEAL]

Attest:

RUTH C. MASON
Attesting Officer

LUTRELLE F. PARKER
Acting Commissioner of Patents and Trademarks

Disclaimer 4,050,887.—*L. John Berggren,* Simsbury; *Charles L. D. Cin,* Avon; and *Joseph R. Reilly,* Naugatuck, Conn. METHOD AND APPARATUS FOR TEMPERATURE CONDITIONING PARTS. Patent dated Sept. 27, 1977. Disclaimer filed Nov. 9, 1981, by the assignee, *Monsanto Co.*

Hereby enters this disclaimer to claims 1, 4, 6, 7, 8, 9, 14, 15, 16, 17, 18, 19 and 20 of said patent.

[*Official Gazette Jan. 5, 1982*]